United States Patent
Lanxner et al.

(10) Patent No.: US 10,467,687 B2
(45) Date of Patent: Nov. 5, 2019

(54) METHOD AND SYSTEM FOR PERFORMING FRAUD DETECTION FOR USERS WITH INFREQUENT ACTIVITY

(75) Inventors: Eyal S. Lanxner, Modiin (IL); Shay Raz, Ramat-Hasharon (IL)

(73) Assignee: SYMANTEC CORPORATION, Mountain View, CA (US)

( * ) Notice: Subject to any disclaimer, the term of this patent is extended or adjusted under 35 U.S.C. 154(b) by 1949 days.

(21) Appl. No.: 12/626,061

(22) Filed: Nov. 25, 2009

(65) Prior Publication Data

US 2011/0125658 A1   May 26, 2011

(51) Int. Cl.
| | | |
|---|---|---|
| *G06Q 10/10* | (2012.01) | |
| *G06Q 10/06* | (2012.01) | |
| *G06Q 30/02* | (2012.01) | |
| *G06Q 30/06* | (2012.01) | |
| *G06Q 40/02* | (2012.01) | |
| *G06Q 50/26* | (2012.01) | |
| *G06Q 30/00* | (2012.01) | |

(52) U.S. Cl.
CPC ......... *G06Q 40/02* (2013.01); *G06Q 30/0185* (2013.01); *G06Q 30/0282* (2013.01); *G06Q 30/0603* (2013.01); *G06Q 50/265* (2013.01)

(58) Field of Classification Search
CPC ............. G06Q 50/265; G06Q 30/0282; G06Q 30/0185; G06Q 30/0603; G06Q 40/02
USPC ........... 702/185; 705/35, 14.39, 38, 39, 318, 705/325, 1.1–912
See application file for complete search history.

(56) References Cited

U.S. PATENT DOCUMENTS

| | | | |
|---|---|---|---|
| 5,819,226 A * | 10/1998 | Gopinathan et al. | 705/44 |
| 7,089,592 B2 | 8/2006 | Adjaoute | |
| 7,107,242 B1 * | 9/2006 | Vasil et al. | 705/39 |
| 7,458,508 B1 | 12/2008 | Shao et al. | |
| 7,523,016 B1 | 4/2009 | Surdulescu et al. | |

(Continued)

FOREIGN PATENT DOCUMENTS

| | | |
|---|---|---|
| WO | WO 2007/044763 | 4/2007 |
| WO | WO 2007/095242 | 8/2007 |

OTHER PUBLICATIONS

Guha, "Rock: A Robust Clustering Algorithm for Categorical Attributes," Inf. Syst. 25(5): 345-366 (2000), 25 pages total.

(Continued)

*Primary Examiner* — Jonathan P Ouellette
(74) *Attorney, Agent, or Firm* — Maschoff Brennan

(57) ABSTRACT

A method of categorizing a recent transaction as anomalous includes a) receiving information about a recent transaction and b) accessing information about one or more historical transactions. The one or more historical transactions have at least one party in common with the recent transaction. The method also includes c) determining a similarity value between the recent transaction and a transaction i of the one or more historical transactions and d) determining if the similarity value is greater than or equal to a predetermined threshold value. The method further includes e) if the similarity is greater than or equal to the predetermined threshold value, categorizing the recent transaction as not anomalous or f) if the similarity is less than the predetermined threshold value, determining if there are additional transactions. If there are additional transactions, incrementing counter i and repeating steps c) through f).

28 Claims, 6 Drawing Sheets

(56) References Cited

U.S. PATENT DOCUMENTS

| | | |
|---|---|---|
| 7,657,460 B2 * | 2/2010 | Findley .................... 705/26.35 |
| 8,032,449 B2 * | 10/2011 | Hu et al. ....................... 705/38 |
| 2006/0010072 A1 | 1/2006 | Eisen |
| 2006/0101402 A1 | 5/2006 | Miller et al. |
| 2007/0220595 A1 * | 9/2007 | M'raihi et al. ................. 726/5 |
| 2008/0033637 A1 | 2/2008 | Kuhlman et al. |
| 2008/0046334 A1 * | 2/2008 | Lee et al. ...................... 705/26 |
| 2008/0086409 A1 | 4/2008 | Moorman et al. |
| 2009/0018940 A1 | 1/2009 | Wang et al. |
| 2009/0150214 A1 | 6/2009 | Mohan |

OTHER PUBLICATIONS

VeriSign Fraud Detection Service [white paper] prepared by VeriSign Authentication Service, dated Mar. 28, 2006, 4 pages total.

VeriSign® Identity Protection (VIP) Fraud Detection Service: Data Sheet [white paper] 2008, 4 pages total.

U.S. Appl. No. 12/604,220, filed Oct. 22, 2009, first named inventor: Eyal S. Lanxner.

U.S. Appl. No. 12/604,208, filed Oct. 22, 2009, first named inventor: Eyal S. Lanxner.

* cited by examiner

METHOD AND SYSTEM FOR PERFORMING FRAUD DETECTION FOR USERS WITH INFREQUENT ACTIVITY

BACKGROUND OF THE INVENTION

Identity theft and on-line fraud have become widespread problems in the United States. Each year, many adults in the U.S. have their identities stolen and numerous accounts are compromised, leading to significant losses as a result of identity theft. While the fraud losses themselves are significant, even more worrisome has been the negative impact to enterprises whose consumers have been victims of these breaches. Account churn, lower transaction volume, and even lower stock prices have made the extent of the losses hard to bear for many enterprises.

Weak authentication has led to Internet identity theft, phishing, and on-line financial fraud. As more consumers use computers and mobile devices for shopping, managing their finances, and accessing health care information, the risk of fraud and identity theft increases. Because of the impact of identity theft and on-line fraud on on-line businesses, more and more enterprises are evaluating authentication and security options for their on-line consumer base. This trend to improve security has also been driven by regulatory guidance related to strengthening authentication and security measures.

Fraud detection systems utilize methods and systems to authenticate users in order to secure employee and business-partner access to corporate networks and applications. The risk of enabling unauthorized access to corporate assets justifies the investment and change in behavior needed to deploy strong authentication. Fraud prevention thus enables the enterprise to make a fairly straightforward risk/reward evaluation. However, because these enterprise solutions have been designed for lower volume deployments, utilizing them for securing consumer applications is not entirely feasible. Scaling these enterprise authentication solutions to millions of users in a cost effective manner is nearly impossible.

Many fraud detection systems use a behavioral engine to assess the level of risk associated with an online transaction. A behavioral engine learns how a consumer uses the system to dynamically identify risk. It responds when consumer behavior changes, even if the change does not break a general rule. For example, a behavioral engine goes on alert when a consumer who always logs on from home suddenly logs in from another country. The same behavioral engine does not interfere when a consumer who regularly logs in from different places in the world changes location. A fraud detection system with both rules and behavioral engines does not require a consumer to change behavior, in fact it creates value from their consistency to help prevent fraud.

Despite the progress made in fraud detection systems based on behavioral engines, improvements in robust systems that can provide fraud detection in the context of a user that has a small number of transactions. Accordingly, there is a need in the art for systems and methods to improve identity protection for consumers who access resources infrequently and prevent fraud in such on-line transactions.

SUMMARY OF THE INVENTION

The present invention relates generally to computer networks. More specifically, the present invention relates to methods and systems for detecting and preventing fraudulent on-line transactions. Merely by way of example, the invention has been applied to a method of detecting anomalous transactions. More particular, the invention provides methods and systems to categorize a transaction as anomalous/not anomalous based on a comparison with a limited number of historical transactions and predetermined factors. The methods and techniques can be applied to a variety of computer networks and communications systems.

According to an embodiment of the present invention, a method of categorizing a recent transaction as anomalous is provided. The method includes a) receiving information about a recent transaction and b) accessing information about one or more historical transactions. The one or more historical transactions have at least one party in common with the recent transaction. The method also includes c) determining a similarity value between the recent transaction and a transaction i of the one or more historical transactions and d) determining if the similarity value is greater than or equal to a predetermined threshold value. The method further includes e) if the similarity is greater than or equal to the predetermined threshold value, categorizing the recent transaction as not anomalous, f) if the similarity is less than the predetermined threshold value, determining if there are additional transactions; and g) if there are additional transactions, incrementing counter i and repeating steps c) through f).

According to another embodiment of the present invention a system for categorizing a recent transaction as anomalous is provided. The system includes a data processor, a communications module coupled to the data processor, and a computer readable medium coupled to the data processor and storing a plurality of instructions for controlling the data processor to categorize the recent transaction as anomalous. The plurality of instructions include a) instructions that cause the data processor to receive information about a recent transaction and b) instructions that cause the data processor to access information about one or more historical transactions. The one or more historical transactions have at least one party in common with the recent transaction. The plurality of instructions also include c) instructions that cause the data processor to determine a similarity value between the recent transaction and a transaction i of the one or more historical transactions and d) instructions that cause the data processor to determine if the similarity value is greater than or equal to a predetermined threshold value. The plurality of instructions further include e) instructions that cause the data processor, if the similarity is greater than or equal to the predetermined threshold value, to categorize the recent transaction as not anomalous, f) instructions that cause the data processor, if the similarity is less than the predetermined threshold value, to determine if there are additional transactions, and g) instructions that cause the data processor, if there are additional transactions, to increment counter i and repeat steps c) through f).

According to a specific embodiment of the present invention, a method of computing a confidence in a determination of a recent transaction as not anomalous is provided. The method includes a) determining a similarity value between the recent transaction and transaction i of one or more historical transactions and b) if the similarity is greater than or equal to a predetermined threshold: c) obtaining at least one of an age or a status of transaction i, d) determining a factor for transaction i based on either the age or the status, e) computing a rank for transaction i based on the similarity value and the factor, and f) storing the computed rank. The method further includes g) determining if there are additional historical transactions of the one or more historical transactions. If there are additional historical transactions, the method includes incrementing counter i and repeating steps a) through g). If there are no additional historical transactions, the method includes determining a maximum of the stored ranks and computing the confidence as the maximum of the stored ranks.

According to another specific embodiment of the present invention, a system for computing a confidence in a determination of a recent transaction as not anomalous is provided. The system includes a data processor, a communications module coupled to the data processor, and a computer readable medium coupled to the data processor and storing a plurality of instructions for controlling the data processor to compute the confidence in the determination of the recent transaction as not anomalous. The plurality of instructions include a) instructions that cause the data processor to determine a similarity value between the recent transaction and transaction i of one or more historical transactions and b) instructions that cause the data processor, if the similarity is greater than or equal to a predetermined threshold, to: c) obtain at least one of an age or a status of transaction i, d) determine a factor for transaction i based on either the age or the status, e) compute a rank for transaction i based on the similarity value and the factor, and f) store the computed rank. The plurality of instructions also include g) instructions that cause the data processor to determine if there are additional historical transactions of the one or more historical transactions, h) instructions that cause the data processor, if there are additional historical transactions, to increment counter i and repeat steps a) through g). If there are no additional historical transactions, the plurality of instructions include instructions that cause the data processor to determine a maximum of the stored ranks and compute the confidence as the maximum of the stored ranks.

According to a particular embodiment of the present invention, a method of computing a confidence in a determination of a recent transaction as anomalous is provided. The method includes a) determining a similarity value between the recent transaction and transaction i of one or more historical transactions, b) obtaining at least one of an age or a status of transaction i, and c) determining a factor for transaction i based on either the age or the status. The method also includes d) computing a rank for transaction i based on the similarity value and the factor, e) storing the computed rank, and f) determining if there are additional historical transactions of the one or more historical transactions. If there are additional historical transactions, the method includes incrementing counter i and repeating steps a) through f). If there are not additional historical transactions, the method includes determining a maximum of the stored ranks and computing the confidence as one minus the maximum of the stored ranks.

According to another particular embodiment of the present invention, a system for computing a confidence in a determination of a recent transaction as anomalous is provided. The system includes a data processor, a communications module coupled to the data processor, and a computer readable medium coupled to the data processor and storing a plurality of instructions for controlling the data processor to compute the confidence in the determination of the recent transaction as anomalous. The plurality of instructions include a) instructions that cause the data processor to determine a similarity value between the recent transaction and transaction i of one or more historical transactions, b) instructions that cause the data processor to obtain at least one of an age or a status of transaction i, and c) instructions that cause the data processor to determine a factor for transaction i based on either the age or the status. The plurality of instructions also include d) instructions that cause the data processor to compute a rank for transaction i based on the similarity value and the factor, e) instructions that cause the data processor to store the computed rank, and f) instructions that cause the data processor to determine if there are additional historical transactions of the one or more historical transactions. If there are additional historical transactions, the plurality of instructions include instructions that cause the data processor to increment counter i and repeat steps a) through f). If there are not additional historical transactions, the plurality of instructions include instructions that cause the data processor to determine a maximum of the stored ranks and compute the confidence as one minus the maximum of the stored ranks.

Many benefits are achieved by way of the present invention over conventional techniques. For example, embodiments of the present invention perform transaction analysis despite the availability of historical data typically utilized in performing a full scale behavioral analysis. Embodiments of the present invention enable a system operator increase the value of available information in characterizing a user behavior. These and other embodiments of the invention along with many of its advantages and features are described in more detail in conjunction with the text below and attached figures.

DETAILED DESCRIPTION OF SPECIFIC EMBODIMENTS

Figure 1:
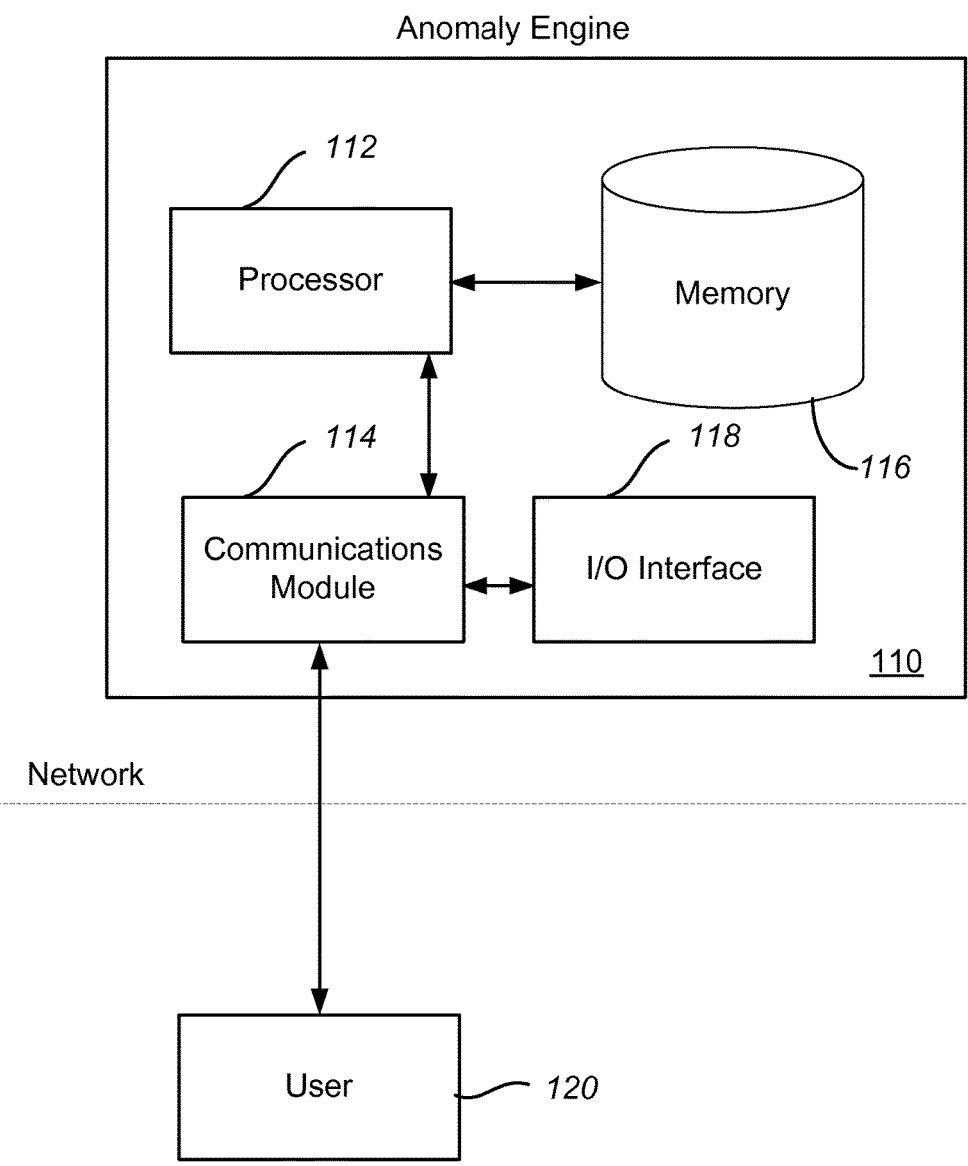
FIG. 1 is a simplified schematic diagram of elements of an anomaly engine according to an embodiment of the present invention.

FIG. 1 is a simplified schematic diagram of elements of an anomaly engine according to an embodiment of the present invention. The anomaly engine 110 can be part of a larger Internet fraud detection and mitigation system and includes a processor 112 (also referred to as a data processor), a communications module 114 and a memory 116. The processor 112 can be a general purpose microprocessor configured to execute instructions and data, such as a Pentium processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like.

The processor 112 is coupled to the memory 116 in order to access stored information for use during fraud detection processes. The memory (also referred to as a database or a computer readable medium) 116 can be local or distributed as appropriate to the particular application. The memory 116 can store information related to historical transactions, program code and instructions executed by the processor 112, and other suitable data. An input/output interface 118 is provided to facilitate control of the anomaly engine by a system operator. The I/O interface 118 also provides a mechanism for delivering performance reports to a system operator, other suitable personnel, or suitable computer systems.

A user 120 interacts with the anomaly engine 110 through a network, for example, the Internet. Patterns of behavior during on-line transactions are monitored by the anomaly engine, for example, the characteristics of a user log-in from a location such as Mountain View, Calif., using the Firefox browser and the Windows operating system. For this transaction (a log-in transaction), several properties are associated with the transaction including the browser type, the operating system, and the like. Patterns associated with financial transactions such as a money transfer can include a periodicity and a range of amount transferred. Using information related to these behavioral patterns, the anomaly engine can construct a user pattern and identify anomalies in the behavior, which can suggest that a transaction is suspicion if it does not follow the typical behavioral pattern for the particular user. Embodiments of the present invention related to methods and systems that are useful when the number of historical transactions available to the anomaly engine are limited. This limited number of transactions can be referred to as a situation in which a user has infrequent activity or an infrequent user.

It should be noted that initially, every user is an infrequent user since at an initial stage, the user makes the first few transactions. Generally, embodiments of the present invention maintain a predetermined number or range of transactions in the system memory, for example, six months of transactions. Therefore, even a long time user can be categorized as an infrequent user if the number of user log-ins or other transactions during a period (e.g., the last six months) are limited.

Figure 2:
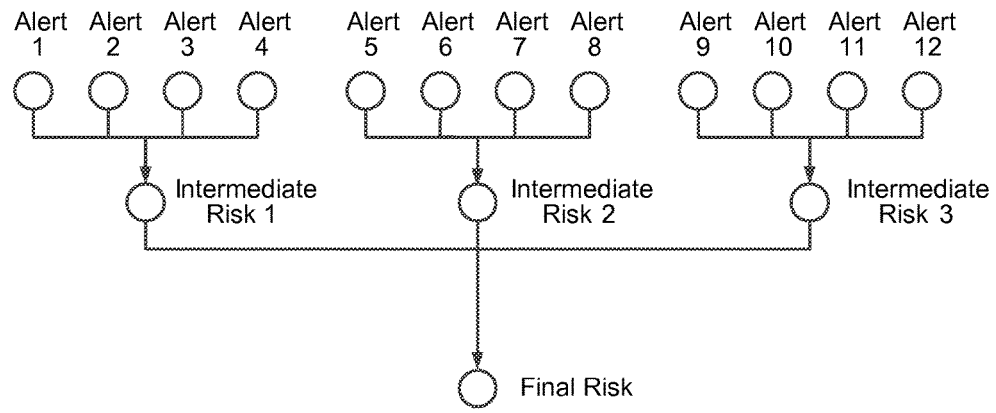
FIG. 2 is a simplified flowchart illustrating a fraud detection strategy according to an embodiment of the present invention.

FIG. 2 is a simplified flowchart illustrating a fraud detection strategy according to an embodiment of the present invention. FIG. 2 illustrates the general method of operation of the fraud detection strategy, also referred to as the policy, which employs a multiple model strategy to form an overall risk score. In general, in order to perform a risk assessment for a given transaction, the fraud detection system utilizes both business logic rules (i.e., a rules-based engine) and behavioral analysis to analyze a transaction. The system then generates a variety of different alerts in response to violation of rules or outputs from the behavioral analysis. The alerts are aggregated into intermediate alerts. In turn, the intermediate alerts are aggregated to create the final risk score.

As an example of alerts generated in response to a transaction, rules could be triggered by the transaction. Rules that could results in alerts include identification of a high risk IP address or an IP address associated with a risky country. If a user has a previous transaction from a first location and the location of the current transaction is so far from the first location that travel between the first and current location is impossible, then an alert will be generated based on violation of a travel time rule. Thus, in FIG. 2, various aspects of the transaction are analyzed, triggering one or more rules that result in the generation of alerts.

Additionally, alerts may be generated if a transaction is categorized as an anomaly, if the transaction is performed at a time that is not a regular activity time for the user, or the like. Thus, many alerts based on rules and other analytical techniques can be generated in response to a transaction. The general process illustrated in FIG. 2 is applicable to users with a significant amount of activity, as well as users with infrequent activity (i.e., the infrequent user) discussed more fully throughout the present specification.

Thus, fraud detection systems typically utilize both rules-based engines and behavioral engines in analyzing and categorizing transactions. Additional description related to a behavioral engine is provided in U.S. patent application Ser. No. 12/604,208, filed on Oct. 22, 2009, entitled "Method and system for weighting transactions in a fraud detection system," and U.S. patent application Ser. No. 12/604,220, filed on Oct. 22, 2009, entitled "Method and system for clustering transactions in a fraud detection system," the disclosures of which are hereby incorporated by reference in their entirety for all purposes.

According to an embodiment of the present invention, different techniques are used to detect suspicious or anomalous transactions, depending on the volume of the user activity. Table 1 illustrates the contribution of the behavioral engine in performing anomaly detection in a specific embodiment of the present invention.

TABLE 1

| Number of Transactions in a Six Month Period | Behavioral Volume |
| --- | --- |
| 0 | None |
| 1-3 | Sparse |
| 4-9 | Partial |
| 10+ | Full |

Referring to Table 1, if the user has not performed any transactions in the last six months, it will not be possible to detect a pattern in the user's behavior, since, by definition, if the number of previous transactions (also referred to as historical transactions) is zero, no behavior patterns can exist for the user. In contrast with no information related to the user's behavior, for tens of transactions, the volume of behavioral data will be sufficient for the behavioral analysis component to be fully utilized by the fraud detection system. Thus, for users with infrequent activity (e.g., sparse behavioral volume), there is a need in the art for methods and systems to supplement the behavioral analysis component of the fraud detection system.

In some embodiments of the present invention, the behavioral component of the fraud detection system is not used for users with one to three historical transactions. Rather, the methods and techniques described herein for infrequent users are utilized. The behavioral analysis component begins to be used for users with four to ten historical transactions. With four historical transactions, the new transaction provides five transactions, which are suitable for analysis by the behavioral engine. Of course, the particular number of transactions and the thresholds for use of the behavioral analysis component are not fixed and can vary as appropriate to the particular application. Thus, rather than using the behavioral analysis component for four or more transactions, this use could be initiated for fewer historical transactions or more historical transactions as appropriate. Moreover, the six month threshold for determining the number of historical transactions is not fixed and can be varied as needed. One of ordinary skill in the art would recognize many variations, modifications, and alternatives.

Referring to the first row of Table 1, when no historical transactions are available (either because the user is new or was inactive for a predetermined period of time), no behavioral analysis can be performed. Several different approaches can be utilized in response to the first transaction by the user, according to the system operator' preference:

Intervene for any first login;

Require the user to employ an identification token during the first login;

Evaluate the transaction's risk score based upon non-behavioral oriented rules such as IP address black lists or the like.

Another approach for the case of no historical transactions is that when a new transaction arrives, the fraud detection system returns a value of Anomaly, with a confidence of one. In another embodiment, for no historical transactions, the policy is to intervene in response to the first transaction and to require the user to validate the transaction. Of course, for policy reasons, it may not be advisable to categorize the first transaction as anomalous.

For rows three and four of Table 1 (4-9 and 10+ historical transactions), the behavioral analysis component is utilized, with the configuration being modified in some instances to accommodate for the number of historical transactions.

For row two of Table 1, the user has 1-3 historical transactions and embodiments of the present invention provide methods and systems to categorize transactions as anomalous, based on the limited number of historical transactions. Referring once again to FIG. 2, it should be noted that in some embodiments, the various models that are used in the fraud detection system are applied to the infrequent user, just as they are applied to a user with frequent activity.

Infrequent users are characterized by a low volume of activity. The knowledge of this behavior can be leveraged and aid in detecting variations in normal sparse activity. When little history is available for a given user (e.g., 1-4 transactions), there is not enough data for constructing robust behavioral patterns. In such cases, we wish to know whether there is at least some direct similarity between the current transaction and the historical ones. Several issues can be raised: does the current transaction have location/connection characteristics similar to the ones in the historical transactions?; can the platform (e.g., OS/Browser operating on a desktop, laptop, or mobile device) of the current transaction be found within the user's historical transactions?; were all historical transactions performed with close proximity to the user's registered address?; is the recent login frequency typical for the user?

Figure 3:
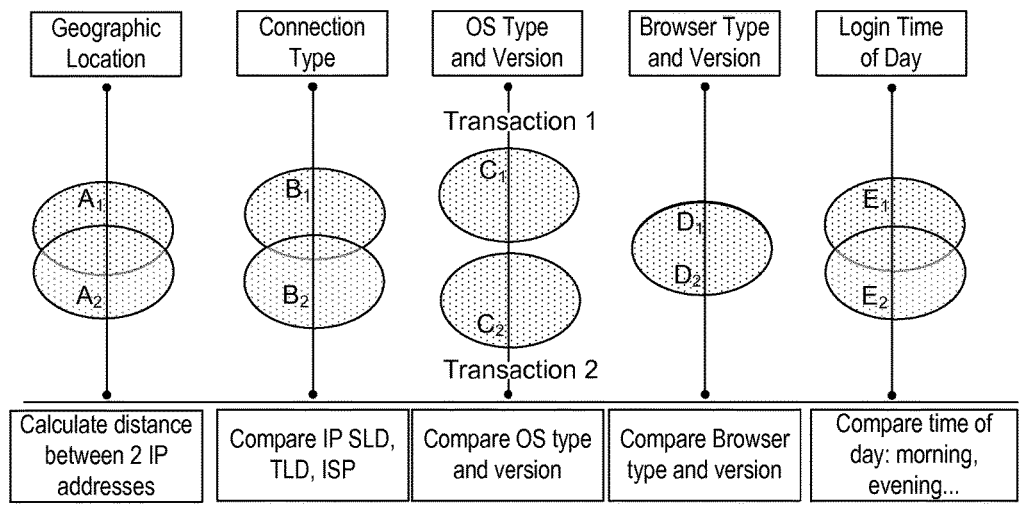
FIG. 3 is a simplified diagram illustrating a similarity comparison between two transactions according to an embodiment of the present invention.

FIG. 3 is a simplified diagram illustrating a similarity comparison between two transactions according to an embodiment of the present invention. In computing a similarity between transactions as illustrated in FIG. 3, a number of comparators are utilized such as the geographic location of the transactions and the connection type. Additional discussion related to computing a similarity between transactions is provided in U.S. patent application Ser. No. 12/604,208, referenced above. In summary, the various properties associated with the transactions are weighted and a weighted sum of the similarity between properties is determined in computing the similarity. Thus, FIG. 3 is a schematic diagram illustrating several of the properties used in computing similarity. Detailed computations are provided in U.S. patent application Ser. No. 12/604,208, which is incorporated by reference in its entirety for all purposes.

Figure 4:
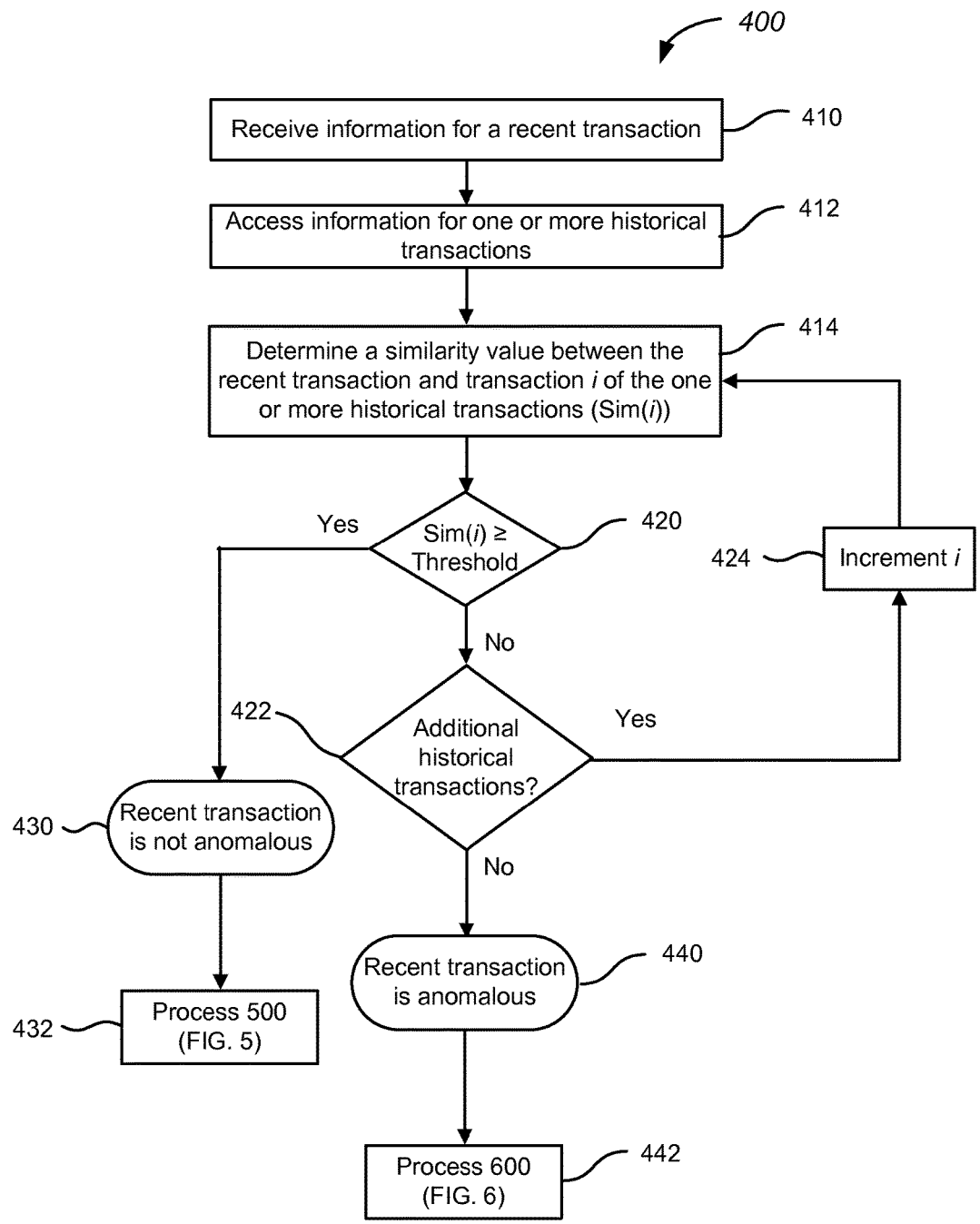
FIG. 4 is a simplified flowchart illustrating a method of determining if a transaction is anomalous or not anomalous according to an embodiment of the present invention.
Figure 5:
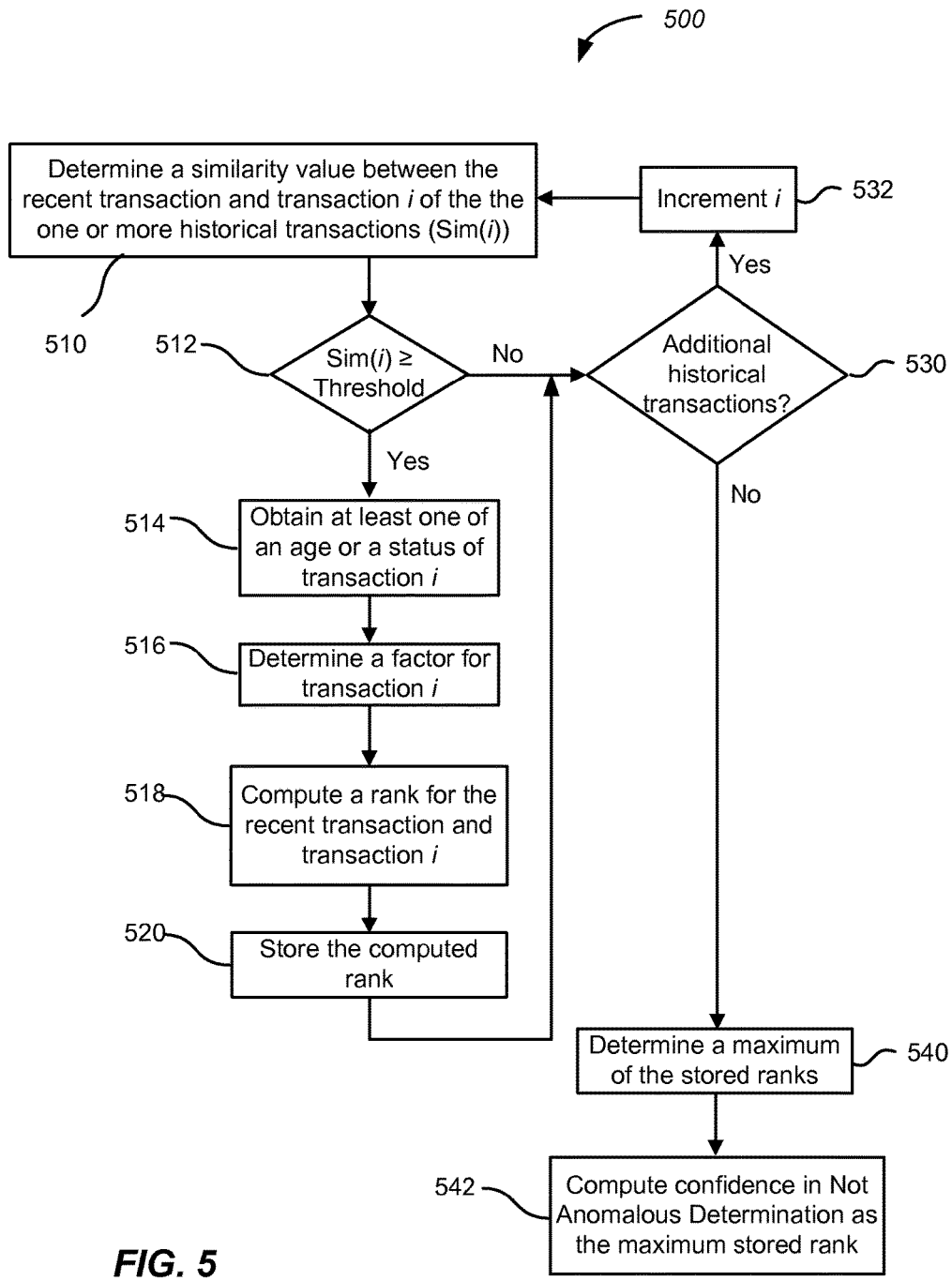
FIG. 5 is a simplified flowchart illustrating a method of computing a confidence in a determination that a transaction is not anomalous according to an embodiment of the present invention.
Figure 6:
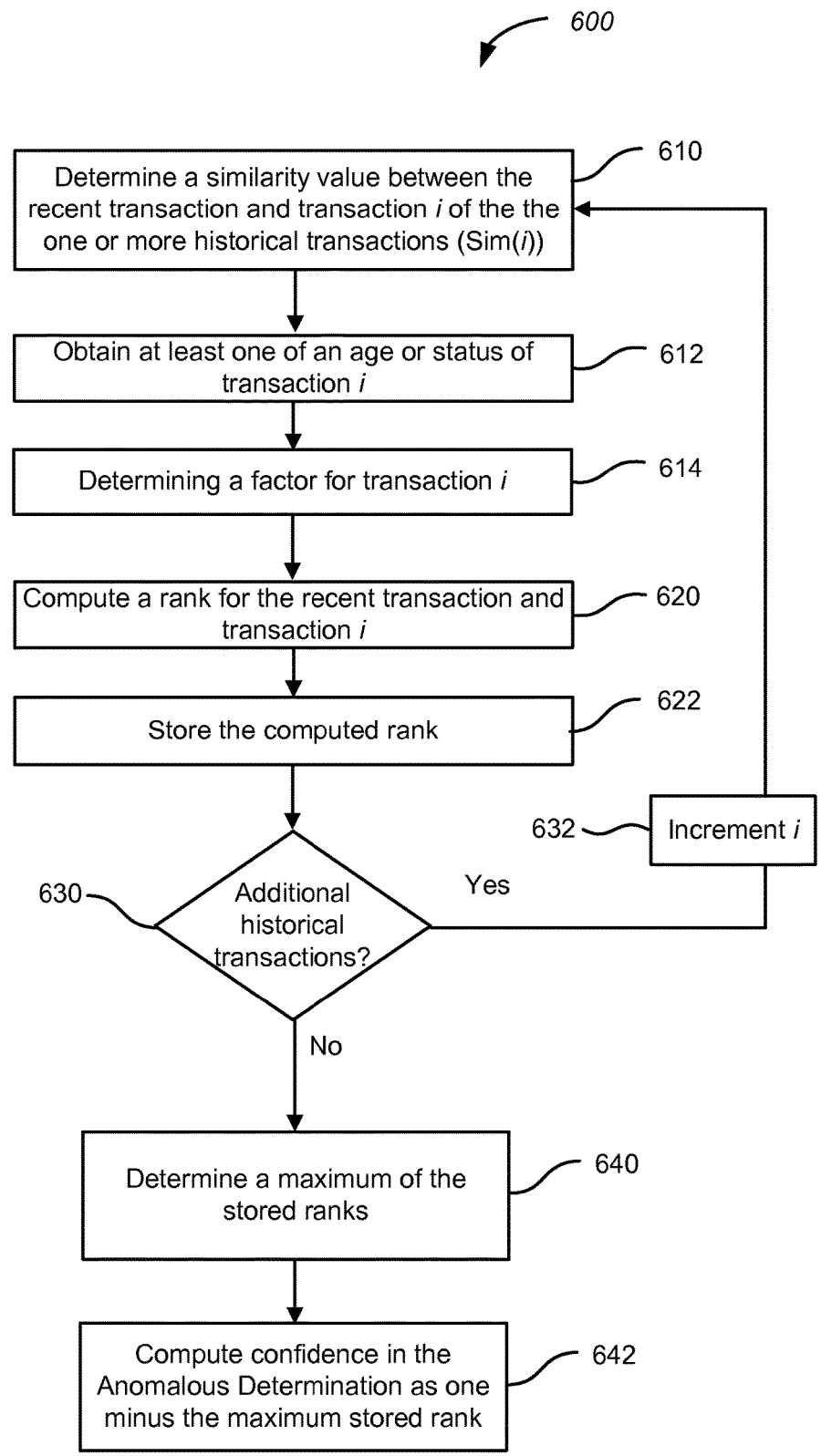
FIG. 6 is a simplified flowchart illustrating a method of computing a confidence in a determination that a transaction is anomalous according to an embodiment of the present invention.

FIGS. 4-6 are simplified flowcharts illustrating a two-stage process of 1) determining if a recent transaction is either anomalous or not anomalous and 2) then computing the confidence in the decision made in the first stage of the process. The methods described in relation to FIGS. 4-6 can be performed separately or in combination.

Initially, a decision is made of whether to return an Anomaly or Not-Anomaly result. Using a similarity threshold, referred to as a predetermined threshold, the methods and systems described herein are used to decide whether the transaction is anomalous. In summary, if the similarity between the recent transaction (also referred to as a target transaction) and one or more of the historical transactions is above the threshold, then the transaction is considered to be not anomalous, otherwise, the transaction is anomalous.

FIG. 4 is a simplified flowchart illustrating a method 400 of determining if a transaction is anomalous or not anomalous according to an embodiment of the present invention. Information is received for a recent transaction (410). The information for the transaction can include, without limitation, information related to the operating system, the browser type (e.g., Internet Explorer, Firefox, Chrome, or the like), the browser version, the IP address associated with the user's activity, the geographical location of the IP address, or the like. The operating system and browser properties are derivatives of the User-Agent and the geographical location and connection are derivatives of the IP address. Information extracted from the IP address can be categorized as geographical location (e.g., country, city, state, longitude, latitude, or the like) and connection information (e.g., Carrier, SLD, Organization, Routing Type, Connection Type, or the like). User-Agent derivatives (e.g., OS, Browser, or the like) and IP derivatives (e.g., Location, Connection) can also be included. For money transfer transactions, information for the transaction can include, without limitation, the Amount, the Destination institution name, the Destination institution country, and the Transfer category. For trading, transaction information can include, without limitation, the Stock's risk levels, the Stock's exchange market, the Stock's origin country, the Stock's market cap, the Stock's industry, or the like.

Information for one or more historical transactions is accessed (412). The information on historical transactions can be stored in a suitable memory accessible to the fraud detection system, for example, memory 116 illustrated in FIG. 1 or computer readable medium 716 in FIG. 7. A similarity value is determined between the recent transaction and a first transaction (i.e., counter i=1) of the one or more historical transactions (414). This similarity value is referred to as Sim(i) with the counter i representing the number of the historical transaction.

In a particular embodiment, if the similarity value between the new transaction and the historical transactions is zero, then the new transaction is considered to be an anomaly and the risk score for the new transaction will be raised accordingly. Additionally, as illustrated in FIG. 1, the risk score computed herein can be combined with other risks during the aggregation process.

The similarity value is compared to a predetermined threshold (420). If the similarity value is greater than or equal to a predetermined threshold value, then the recent transaction is considered to not be anomalous (430). Thus, for recent transactions that are similar (equal to or above a threshold) to one or more of the historical transactions, a determination of not anomalous is made. The confidence in the decision is than computed (432) as discussed in relation to FIG. 5.

If the similarity value between the recent transaction and the first historical transaction is less than the predetermined threshold, a determination is made of whether there are additional historical transactions (422). If there are additional historical transactions, then the counter i is incremented and steps (414) and (420) are repeated, comparing the recent transaction to the second historical transaction. As long as the similarity is less than the predetermined threshold, each of the historical transactions will be compared to the recent transaction to compute the similarity between transactions. If the similarity between all of the historical transactions and the recent transaction is less than the predetermined threshold, then the transaction will be considered as an anomalous (440). Of course, if the similarity between transactions is above the threshold for at least one of the historical transactions, then the transaction will be considered as not anomalous (430). If the recent transaction is categorized as anomalous, then the confidence in the decision will be computed (442) as described in relation to FIG. 6. Although the determination in (420) was of whether the similarity between transactions was greater than or equal to the predetermined threshold, this is merely one implementation and a decision based on operators (e.g., greater than) is included within the scope of the present invention.

FIG. 5 is a simplified flowchart illustrating a method of computing a confidence in a determination that a transaction is not anomalous according to an embodiment of the present invention. Several terms are utilized in computing the confidence, including the similarity between transactions and the age/status of the historical transaction. The similarity between transactions has been discussed in relation to step (414) in FIG. 4.

Table 2 lists the transaction age/status and corresponding factors used in computing the confidence.

TABLE 2

| Transaction Age/Status | Factor |
| --- | --- |
| Rejected Transaction | 1.0 |
| 1 month or more | 0.8 |
| 3 weeks | 0.7 |
| 2 weeks | 0.5 |
| 1 week | 0.3 |
| 3 days | 0.1 |
| 1 day or less | 0 |

The term "rejected transaction" is used for a historical transaction that raised an alert to the user that the user rejected. After the transaction was alerted for the user, the user, in the resulting intervention, rejected the alert status and indicated that the transaction was legitimate. Thus, in rejecting the categorization as suspicious, the user increased the reliability of the historical transaction as an indicator of appropriate use. Because the rejected transaction is representative of acceptable use, the factor is 1.0 is used, which will tend to result in a high confidence score in the decision based on comparisons with the rejected historical transaction.

As illustrated in Table 2, the older the transaction, the higher the confidence that the transaction was not fraudulent. On the contrary, the newer the transaction, the lower the confidence that the transaction was not fraudulent. Typically, fraudulent transactions are detected after some period of time passes after the transaction is performed. As an example, if money is fraudulently removed from a bank account, a user may not be aware of the theft for several days or weeks after the money is removed from the account. After a month passes, the user will receive a bank statement and the fraud will likely be detected. Thus, as time passes, the likelihood of a fraudulent transaction being detected will increase. Consequently, the older the transaction without any detection of fraud, the more likely the transaction was valid. In other words, fraudulent activity tends to be short term—from a few hours to several days. Hence, the chance that a current transaction and the historical transaction belong to the same fraudulent activity are low if the time period between the two transactions is large enough. Therefore, even if the two transactions are fraudulent, a comparison can be made between them since they are most likely to belong to different events, and therefore, be dissimilar.

Thus, in summary, for a rejected transaction, meaning that the user has approved the transaction after an alert had been raised, there is a high level of confidence (factor=1) that the transaction is valid. Additionally, the older the transaction, the higher the level of confidence that the transaction is valid.

Referring to FIG. 5, after it has been determined that the recent transaction is not anomalous in step (430) of FIG. 5, process 500 is performed. The process 500 includes determining a similarity value between the recent transaction and a first transaction of the one or more historical transactions (510). Since the similarity values between the recent transaction and the transactions of the one or more historical transactions have been determined in step (414), these values can be stored and then reused or the values can be calculated again as needed. If the similarity value is greater than or equal to a predetermined threshold (512), then additional information related to the transaction is obtained. This information includes at least one of an age or a status of the transaction (514). Based on either the age or the status of the transaction, a factor is determined for the transaction (516). Table 2 lists exemplary factors for several ages and the status as a rejected transaction. Other values can be utilized as the factor as appropriate. In some embodiments, both the age and the status are utilized in determining the factor. One of ordinary skill in the art would recognize many variations, modifications, and alternatives.

A rank is computed for the recent transaction and transaction i of the one or more historical transactions (518). The computed rank is stored in a database (520). In an embodiment, the rank is the product of the similarity value between the recent transaction and transaction i and the factor for transaction i.

A determination is then made of whether there are additional historical transactions that have not been analyzed (530). If the similarity value between the recent transaction and transaction i of the historical transactions was less than the predetermined threshold in step (512), the process advances to step (530). The counter i is incremented (532) and the similarity value between the recent transaction and the next historical transaction is determined or retrieved from memory. Thus, transactions from the one or more historical transactions are evaluated for which the similarity with the recent transaction is greater than or equal to the predetermined threshold.

Once the set of historical transactions for which the similarity with the recent transaction is greater than or equal to the predetermined threshold is determined using the above process, a maximum of the stored ranks is determined (540) and the confidence in the decision that the recent transaction is not anomalous is computed as the maximum stored rank (542) (i.e., Confidence(Not-Anomalous)= Max{Sim(i)·Factor(i)} for all transaction pairs for which the similarity is greater than or equal to the predetermined threshold). In some embodiments, steps (540) and (542) are combined as a single calculation in which the confidence is equal to the maximum of the stored ranks.

In other words, in process 500 described in relation to FIG. 5, for the anomaly confidence decision, the historical transaction that has the highest product of the similarity and the factor is considered. For this historical transaction, the rank will be a combination of the similarity to the recent transactions and perhaps it will be the oldest transaction of the historical transactions or a rejected transaction. This historical transaction will have the most potential to be similar to the recent transaction, and will then be used in determining the confidence in the decision that the recent transaction was anomalous.

It should be appreciated that the specific steps illustrated in FIG. 5 provide a particular method of computing a confidence in a determination that a transaction is not anomalous according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 6 is a simplified flowchart illustrating a method of computing a confidence in a determination that a transaction is anomalous according to an embodiment of the present invention. The process 600 includes determining a similarity value between the recent transaction and a first transaction of the one or more historical transactions (610). Since the similarity values between the recent transaction and the transactions of the one or more historical transactions have been determined in step (414), these values can be stored and then reused or the values can be calculated again as needed. Additional information related to the transaction is then obtained. This information includes at least one of an age or a status of the transaction (612). Based on either the age or the status of the transaction, a factor is determined for the transaction (614). Table 2 lists exemplary factors for several ages and the status as a rejected transaction. Other values can be utilized as the factor as appropriate. In some embodiments, both the age and the status are utilized in determining the factor. One of ordinary skill in the art would recognize many variations, modifications, and alternatives.

A rank is computed for the recent transaction and transaction i of the one or more historical transactions (620). The computed rank is stored in a database (622). In an embodiment, the rank is the product of the similarity value between the recent transaction and transaction i and the factor for transaction i.

A determination is then made of whether there are additional historical transactions that have not been analyzed (630). If there are additional historical transactions, the counter i is incremented (632) and steps (610) through (622) are repeated for the next transaction of the historical transactions. Thus, the rank is computed for each combination of the recent transaction and the one or more historical transactions.

Given the set of computed ranks for each transaction pair, a maximum of the stored ranks is determined (640) and the confidence in the decision that the recent transaction is anomalous is computed as one minus the maximum stored rank (642) (i.e., Confidence(Anomalous)=1−Max {Sim(i)·Factor(i)} for all transaction pairs). In some embodiments, steps (640) and (642) are combined as a single calculation in which the confidence is equal to the one minus the maximum of the stored ranks.

It should be appreciated that the specific steps illustrated in FIG. 6 provide a particular method of computing a confidence in a determination that a transaction is anomalous according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

It should be noted that the confidence computed in some embodiments is an absolute confidence, not relative to the predetermined threshold for transaction similarity. As an example, consider a condition in which the predetermined threshold for transaction similarity is 85%. If, for a transaction pair, the similarity was 86%, just 1% over the threshold, then this situation can be considered in two ways. On one hand, the similarity is 86% similar, which is high. On the other hand, it is only 1% over the threshold, which could be considered to be low. In computing the confidence, two options are available, computing in terms of the similarity threshold or in an absolute manner independent of the threshold. According to some embodiments of the present invention, the confidence is computed in an absolute manner independent of the predetermined threshold for similarity.

Figure 7:
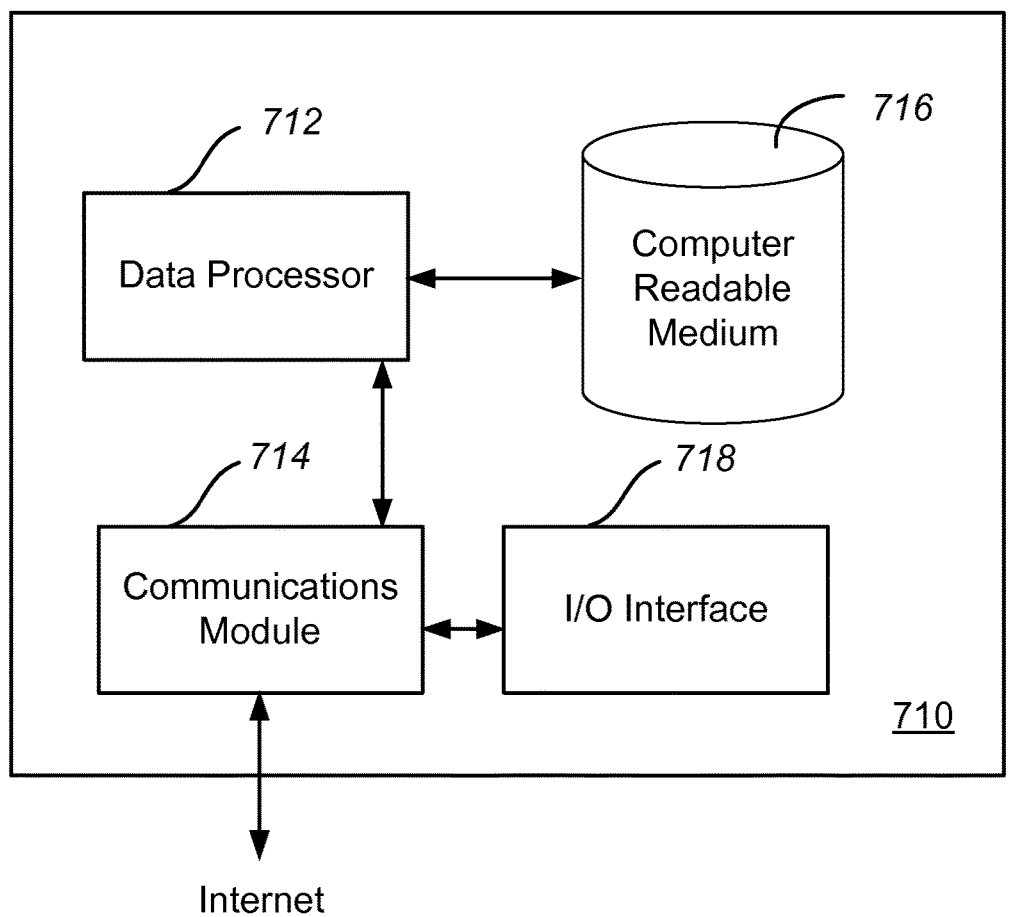
FIG. 7 is a simplified schematic diagram of an anomaly confidence generator according to an embodiment of the present invention.

FIG. 7 is a simplified schematic diagram of an anomaly confidence generator according to an embodiment of the present invention. The anomaly confidence generator 710 is operable to perform the methods described herein and includes a data processor 712 coupled to a computer readable medium 716. The data processor 712 is operable to perform computations and calculations, the results of which may be stored in the computer readable medium 716. The computer readable medium 716 is operable to store, in addition to data, program code and instructions executed by the data processor 712. The data processor 712 is coupled to communications module 714 and I/O interface 718, enabling a user to communicate with the anomaly confidence generator 710 through a network, for example, the Internet.

The anomaly confidence generator is operable to perform methods of determining a confidence in a decision that a transaction was anomalous as well as methods of determining a confidence in a decision that a transaction was not anomalous. In one implementation, the anomaly confidence generator is a component of one or more elements of a larger fraud detection system, such as the anomaly engine illustrated in FIG. 1. For example, the components illustrated in FIG. 7 can be shared with one or more of the components illustrated in FIG. 1. Thus, a single processor could perform the functions associated with the processor 112 and the data processor 712. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A non-transitory computer readable medium having instructions stored thereon which, when executed by a computer processor, cause the computer processor to perform operations comprising:
for each previous transaction among one or more historical transactions for a party:
determining, by the computer processor configured to automate categorization, a similarity value between a current transaction for the party and the previous transaction, wherein the similarity value is determined by computing an initial weight for each of the properties of a set of properties, computing a similarity between each of the properties of the current transaction and the properties of the previous transaction, adjusting the initial weight for each of the properties based on a measure of the commonness of each of the properties of the set of properties, normalizing the adjusted weights, and computing the similarity value by summing the products of the normalized adjusted weights and the computed similarities;
determining, by the computer processor configured to automate categorization, that the similarity value is greater than or equal to a predetermined threshold value;
categorizing, by an anomaly confidence generator component of the computer processor, the current transaction as not anomalous in response to determining that the similarity value is greater than or equal to the predetermined threshold value;
determining, by the computer processor configured to automate categorization, a factor for the previous transaction based on an age of the previous transaction;
computing, by the computer processor configured to automate categorization, a rank for the previous transaction using the similarity value and the factor; and
storing, by the computer processor configured to automate categorization, the computed rank in a database configured to store the computed rank; and
computing, by the computer processor configured to automate categorization, a confidence in the categorization of the current transaction as not anomalous based on the stored ranks, wherein the confidence indicates whether the current transaction for the party is a fraudulent transaction, and wherein the current transaction is an Internet log-in.

2. The computer readable medium of claim 1 wherein the factors for the one or more historical transactions increase with the age of the one or more historical transactions.

3. The computer readable medium of claim 1 wherein operations further comprise determining a maximum of the stored ranks, and wherein the confidence is based on the maximum of the stored ranks.

4. The computer readable medium of claim 1 wherein the party comprises an Internet user.

5. The computer readable medium of claim 1 wherein the computed rank is a function of the similarity value multiplied by the factor.

6. The computer readable medium of claim 1 wherein the computed rank is based on a status of the previous transaction and the similarity value for the previous transaction.

7. A computer-implemented method comprising:
for each previous transaction among one or more historical transactions for a party:
determining, by a computer processor configured to automate categorization, a similarity value between a current transaction for the party and the previous transaction, wherein the similarity value is determined by computing an initial weight for each of the properties of a set of properties, computing a similarity between each of the properties of the current transaction and the properties of the previous transaction, adjusting the initial weight for each of the properties based on a measure of the commonness of each of the properties of the set of properties, normalizing the adjusted weights, and computing the similarity value by summing the products of the normalized adjusted weights and the computed similarities;
determining, by the computer processor configured to automate categorization, that the similarity value is greater than or equal to a predetermined threshold value;
categorizing, by an anomaly confidence generator component of the computer processor, the current transaction as not anomalous in response to determining that the similarity value is greater than or equal to the predetermined threshold value;
determining, by the computer processor configured to automate categorization, a factor for the previous transaction based on an age of the previous transaction;
computing, by the computer processor configured to automate categorization, a rank for the previous transaction using the similarity value and the factor; and
storing, by the computer processor configured to automate categorization, the computed rank in a database configured to store the computed rank; and
computing, by the computer processor configured to automate categorization, a confidence in the categorization of the current transaction as not anomalous based on the stored ranks, wherein the confidence indicates whether the current transaction for the party is a fraudulent transaction, and wherein the current transaction is an Internet log-in.

8. The method of claim 7 further comprising determining a maximum of the stored ranks, and wherein the confidence is based on the maximum of the stored ranks.

9. The method of claim 7 wherein the one or more historical transactions comprise three or more transactions.

10. The method of claim 7 wherein the computed rank is a function of the similarity value multiplied by the factor.

11. The method of claim 7 wherein the computed rank is based on a status of the previous transaction and the similarity value for the previous transaction.

12. The method of claim 11 wherein the status of at least one of the historical transactions is a rejected status.

13. The method of claim 12 wherein the factor is equal to one for the rejected status.

14. The method of claim 7 wherein the factors for the one or more historical transactions increase with the age of the one or more historical transactions.

15. A computer-implemented method comprising:
for each previous transaction among one or more historical transactions for a party:
determining, by a computer processor configured to automate categorization, a similarity value between a current transaction for the party and the previous transaction, wherein the similarity value is determined by computing an initial weight for each of the properties of a set of properties, computing a similarity between each of the properties of the current transaction and the properties of the previous transaction, adjusting the initial weight for each of the properties based on a measure of the commonness of each of the properties of the set of properties, normalizing the adjusted weights, and computing the similarity value by summing the products of the normalized adjusted weights and the computed similarities;

determining, by the computer processor configured to automate categorization, that the similarity value is less than a predetermined threshold value;

categorizing, by an anomaly confidence generator component of the computer processor, the current transaction as anomalous in response to determining that the similarity value is less than the predetermined threshold value;

determining, by the computer processor configured to automate categorization, a factor for the previous transaction based on an age of the previous transaction;

computing, by the computer processor configured to automate categorization, a rank for the previous transaction using the similarity value and the factor; and storing, by the computer processor configured to automate categorization, the computed rank in a database configured to store the computed rank; and computing, by the computer processor configured to automate categorization, a confidence in the categorization of the current transaction as anomalous based on the stored ranks, wherein the confidence indicates whether the current transaction for the party is a fraudulent transaction, and wherein the current transaction is an Internet log-in.

16. The method of claim 15 further comprising determining a maximum of the stored ranks, and wherein the confidence is based on the maximum of the stored ranks.

17. The method of claim 15 wherein the one or more historical transactions comprise three or more transactions.

18. The method of claim 15 wherein the computed rank is based on a status of the previous transaction and the similarity value for the previous transaction.

19. The method of claim 18 wherein the status of at least one of the historical transactions is a rejected status.

20. The method of claim 19 wherein the factor is equal to one for the rejected status.

21. The method of claim 15 wherein the factors for the one or more historical transactions increase with the age of the one or more historical transactions.

22. The method of claim 15 wherein the computed rank is a function of the similarity value multiplied by the factor.

23. A system comprising:
a computer processor configured to automate categorization; and
a non-transitory computer readable medium coupled to the computer processor and having instructions stored thereon, which when executed by the computer processor, cause the computer processor to:
for each previous transaction among one or more historical transactions for a party:
determine a similarity value between a current transaction for the party and the previous transaction, wherein the similarity value is determined by computing an initial weight for each of the properties of a set of properties, computing a similarity between each of the properties of the current transaction and the properties of the previous transaction, adjusting the initial weight for each of the properties based on a measure of the commonness of each of the properties of the set of properties, normalizing the adjusted weights, and computing the similarity value by summing the products of the normalized adjusted weights and the computed similarities;
determine that the similarity value is greater than or equal to a predetermined threshold value;
categorize, via an anomaly confidence generator component of the computer processor, the current transaction as not anomalous in response to the determination that the similarity value is greater than or equal to the predetermined threshold value;
determine a factor for the previous transaction based on an age of the previous transaction;
compute a rank for the previous transaction using the similarity value and the factor; and
store the computed rank in a database configured to store the computed rank; and
compute a confidence in the categorization of the current transaction as not anomalous based on the stored ranks, wherein the confidence indicates whether the current transaction for the party is a fraudulent transaction, and wherein the current transaction is an Internet log-in.

24. The system of claim 23 wherein the factors for the one or more historical transactions increase with the age of the one or more historical transactions.

25. The system of claim 23 wherein the instructions further cause the computer processor to determine a maximum of the stored ranks, and wherein the confidence is based on the maximum of the stored ranks.

26. The system of claim 23 wherein the party comprises an Internet user.

27. The system of claim 23 wherein the computed rank is a function of the similarity value multiplied by the factor.

28. The system of claim 23 wherein the computed rank is based on a status of the previous transaction and the similarity value for the previous transaction.

* * * * *